United States Patent
Bonola

(10) Patent No.: US 6,173,373 B1
(45) Date of Patent: Jan. 9, 2001

(54) METHOD AND APPARATUS FOR IMPLEMENTING STABLE PRIORITY QUEUES USING CONCURRENT NON-BLOCKING QUEUING TECHNIQUES

(75) Inventor: Thomas J. Bonola, Tomball, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/173,597

(22) Filed: Oct. 15, 1998

(51) Int. Cl.[7] .................................................. G06F 12/00
(52) U.S. Cl. ............................................. 711/147; 711/153
(58) Field of Search ..................................... 711/147, 153

(56) References Cited

PUBLICATIONS

Stone, Janice, "A Simple and Correct Shared–Queue Algorithm Using Compare–and–Swap", Proceedings of Supercomputing '90; 12–16 Nov. 1990; pp. 495–504.*
Prakash, Sundeep et al., "A Nonblocking Algorithm for Shared Queues Using Compared–and–Swap", IEEE Transaction on Computers, May 1994; pp. 548–559.*
Mendel, Brett; "Server I/O all set to flow"; *Lantimes,* Oct. 27, 1997, vol. 14, Issue 22; cover page and p. 31.
Briggs, Chris; "Smarter and Faster I/O for Servers"; CORE: Operating Systems; *Byte,* May 1, 1996, vol. 2, No. 5.
Thompson, Tom; "I2O Beats I/O Bottlenecks"; *Byte,* Aug. 1997, pp. 85, 86 and 3 additional pages.
I2O Introduction; Technology Backgrounder; Aug. 13, 1997; http://www.i2osig.org/Architecture/TechBack.html.
i960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrounder", http://www.i2osig.org/Architecture/TechBack.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.
Goble, Scott, et al.; "Intelligent I/O Architecture"; http://www.i2osig.org; Jun. 1996; 22 pages.
"Press Releases and Clips"; http://www.i2osig.org/Press; Feb. 6, 1998; 4 pages.
Listing of Press Releases; http://altavista.digital.com/cgi–bin/quer . . . =21%2FMar%2F86&d1=&search.x=46&search.y=6; Feb. 6, 1998; 2 pages.
Crothers, Brooke; "Intel server chip gets big backing", Oct. 7, 1997; http://www.news.com/News/Item/0,4,14962,00.html; Feb. 6, 1998.

*Primary Examiner*—Reginald G. Bragdon
(74) *Attorney, Agent, or Firm*—Fletcher, Yoder & Van Someren

(57) ABSTRACT

A method and apparatus for selectively incrementing a count number associated with nodes which are subject to a compare and swap operation in a concurrent non-blocking priority queue. A memory is partitioned into a free list and a priority queue, and stores data in multiple nodes residing at least in the free list. Each node has a pointer and a count number associated therewith. Multiple processors access the memory and perform a compare and swap operation on the nodes. The count numbers associated with nodes are next fields selectively incremented only upon a successful compare and swap operation of a node being enqued behind it and when the enqued node is put onto one of the lists of the priority list.

13 Claims, 11 Drawing Sheets

PUBLICATIONS

"HP Demonstrates Commitment to I2O Standard With New I2O Disk–array Controller"; *Hewlett Packard;* Press Release, Atlanta, Oct. 8, 1997; http://hpcc920.external.hp.com/pressre1/oct97/08oct97b.html; Feb. 6, 1998; 2 pages.

"I2O: Disaster in the making for the freeware community"; Stephen S. Edwards; http://22.kenandted.com/i2o/disaster.html; Feb. 6, 1998; 2 pages.

Michael, Maged M. and Scott, Michael L.; "Simple Fast, and Practical Non–Blocking and Blocking Concurrent Queue Algorithms"; Parallel Processing Symposium, 1997.Proceedings. Apr. 1997; pp. 267–273.

Michael, Maged M. and Scott, Michael L.; "Relative Performance of Preemption–Safe Locking and Non–Blocking Synchronization on Multiprogrammed Shared Memory Multiprocessors"; Proceedings of the Fifteenth Annual ACM Symposium on Principles of distributed computing; May 1996; pp. 267–275.

Michael, Maged M. and Scott, Michael L.; "Non–Blocking Algorithms and Preemption–Safe Locking on Multiprogrammed Shared Memory Multiprocessors"; Mar. 1997; 35 pages.

* cited by examiner

METHOD AND APPARATUS FOR IMPLEMENTING STABLE PRIORITY QUEUES USING CONCURRENT NON-BLOCKING QUEUING TECHNIQUES

FIELD OF THE INVENTION

The present invention relates in general to the implementation and control of non-blocking queuing techniques for priority queues used in parallel software applications having shared data structure, and more particularly, but not by way of limitation, to a method and apparatus for selectively incrementing count numbers associated with addresses of nodes in free lists and priority queues using concurrent non-blocking queuing techniques.

BACKGROUND OF THE INVENTION

Computer systems are increasingly incorporating multi-processing architectures which execute parallel software applications that share access to common data structures. Concurrent queues are used in multiprocessing computing environments. To insure "correctness," concurrent access to shared queues is synchronized. Traditional approaches to synchronizing access to critical regions have incorporated operating system synchronization primitive. These approaches are "blocking" and are not suitable for providing multiprocessor safe synchronization of critical regions between multiple threads of execution in user space (i.e. application software). The blocking characteristic of spin-lock methods also reduces software scalability in situations of high contention in critical regions of a multiprocessor environment.

A set of concurrent non-blocking methods which demonstrate good performance over traditional spinlock methods of multiprocessor synchronization have been developed by Maged M. Michael and Michael L. Scott. These methods allow multiple processors to gain concurrent non-blocking access to shared First In First Out (FIFO) queues with immunity from inopportune preemption and are especially useful for parallel software applications requiring shared access to FIFO queues. Furthermore, these methods demonstrate nearly linear scalability under high contention of critical regions in a multiprocessor environment and are incorporated directly in application software. These methods do not affect processor interrupts and do not require spinlock methods to provide mutual exclusion to a shared critical region. These methods are presented and described in greater detail in a publication authored by Maged M. Michael and Michael L. Scott, entitled *"Simple, Fast, and Practical Non-Blocking and Blocking Concurrent Queue Algorithms,"* published in the 15th ACM Symposium on Principles of Distributed Computing (PODC), May 1996, which is incorporated herein by reference.

One shortcoming of these queuing methods involves a condition referred to as an "ABA" condition. The "ABA" condition occurs on computing platforms, such as the Intel 486 and the Pentium class lines of processors, which utilize a Compare-And-Swap (CAS) atomic primitive. The "ABA" condition occurs when a process reads a value "A" from a shared memory location, computes a new value and then attempts the CAS operation. In certain circumstances, the CAS operation may succeed when it should have failed. Such a situation arises when, between the memory read and the CAS operation, some other process or processes change the value "A" to value "B" and then back to value "A." Although the CAS operation succeeds since the value of the shared memory location has returned to value "A," the value in the memory location to which "A" points may have changed. To reduce the probability of encountering the "ABA" condition, the aforementioned queuing methods implement a sequence or count number as part of node address associated with the shared memory location. The count number is incremented with every successful CAS operation so that a determination can be made as to whether the contents of the shared memory location has been altered. While the use of count numbers reduces the probability of encountering the "ABA" condition, the method falls short on the previously mentioned Intel processors due to the frequent incrementing of the count number which causes the count to wrap around and possibly end up at the original count number. The probability of a wrap around condition occurring is especially likely in high contention situations and increases as the speed of the processor increases and the total number of nodes in the queue decreases.

It would be advantageous therefore, to devise a method and apparatus which selectively increments count numbers associated with nodes in a priority queue to reduce the number of times the count numbers are incremented. Such a method and apparatus would increase the time between the occurrence of wrap around conditions and thereby, reduce the likelihood of encountering an "ABA" condition.

SUMMARY OF THE INVENTION

The present invention overcomes the above identified problems as well as other shortcomings and deficiencies of existing technologies by providing a method and apparatus for selectively incrementing a count number associated with a node which is subject to a compare and swap operation in a concurrent non-blocking priority queue. A memory stores data in multiple nodes residing in at least one of a free list queue and a priority queue. The nodes store both data and references to other nodes within the free list and the priority queue. An address of each node includes a pointer and a count number. Multiple processors access the memory and operate on the multiple nodes, including a compare and swap operation. The count number of a node is selectively incremented only upon a successful compare and swap operation and when a node is placed on a select FIFO list of the priority queue.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

With reference to FIGS. 1, 2, 3, 4a–4d, 5a–5c, 6a–6c, 7a–7c and 8 there are shown block diagrams illustrating an exemplary embodiment of the present invention. The purpose of these block diagrams is to illustrate, among other things, the features of the present invention and the basic principles of operation thereof. These block diagrams are not necessarily intended to schematically represent particular modules of circuitry or control paths.

Figure 1:
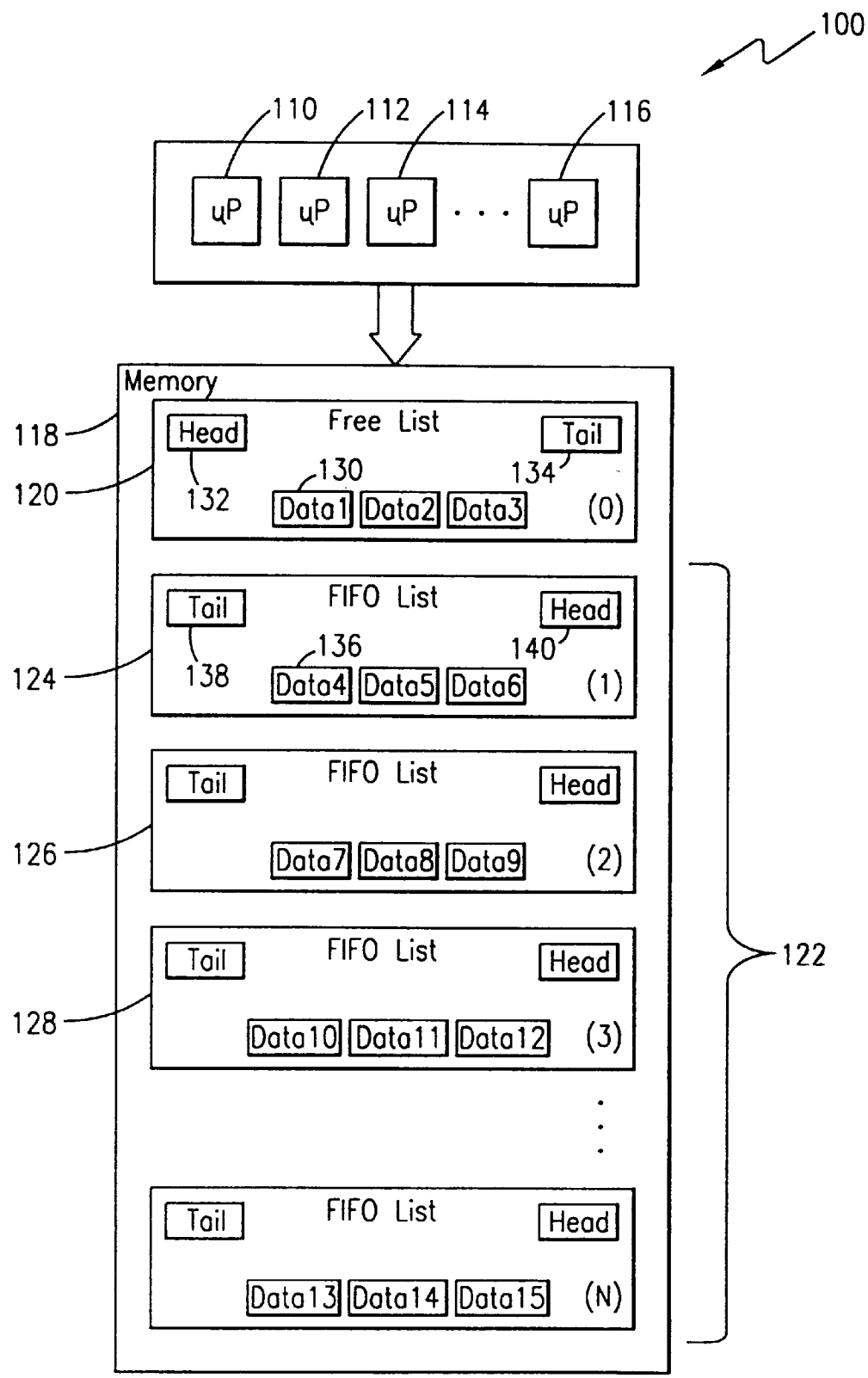
FIG. 1 is a schematic block diagram of a computer system utilizing the present invention.

Referring now to FIG. 1, there is illustrated schematic block diagram of a computer system 100 in accordance with the principles of the present invention. As depicted computer system 100 is a multiprocessor system and includes multiple processors 110, 112, 114 and 116 which execute parallel software applications. Computer system 100 also includes memory 118, which is partitioned to include a free list 120, and a priority queue 122. Priority queue 122 includes multiple FIFO lists, such as FIFO lists 124, 126 and 128.

The free list 120 includes nodes, such as node 130, a head 132 and a tail 134. Each of the nodes in the free list 120 is a memory packet used to hold both data and a reference to the next node in the list. The nodes of free list 120 are organized as a last-in-first-out (LIFO) based concurrent non-blocking stack used to hold free nodes available to queue data onto the FIFO lists of priority queue 122.

Each of the FIFO lists of priority queue 122 include nodes, such as nodes 136, a tail, such as tail 138, and a head, such as head 140. As with the free list, each node in the FIFO lists of priority queue 122 is a memory packet used to hold both data and a reference to the next node in the list. The nodes of each of the FIFO lists of priority queue 122 are organized as a first-in-first-out (FIFO) based concurrent non-blocking queue.

In this exemplary embodiment, free list 120 and each of the FIFO lists of priority queue 122 will always contain at least one node, referred to as a dummy node, which prevents the head pointers and the tail pointers associated with each of the lists from assuming a null value.

Figure 2:
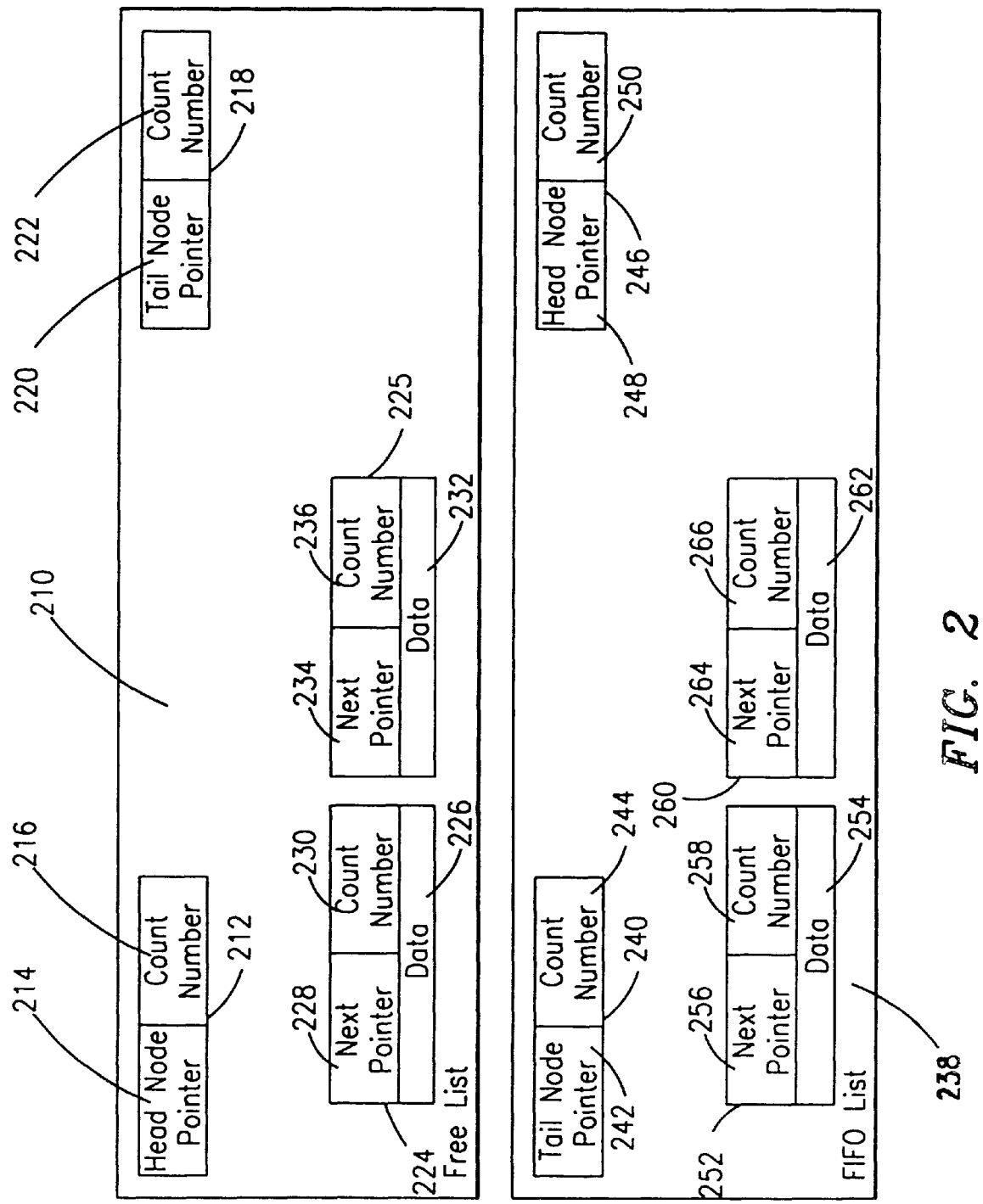
FIG. 2 is a schematic block diagram illustrating exemplary contents of a free list queue and a priority queue in accordance with the principles of the present invention.

Referring now to FIG. 2, there is illustrated a more detailed description of exemplary embodiments of a free list 210 and one FIFO list 238 of a priority queue in accordance with the principles of the present invention.

Still referring to FIG. 2, free list 210 includes a head 212 having a head node pointer 214 and a count number 216. Free list 210 also includes a tail 218 having a tail node pointer 220 and a counter number 222. As discussed herein above, exemplary embodiments of a free list can include multiple nodes and as illustrated, free list 210 includes nodes 224 and 225. Node 224 includes data, a next pointer and a count number. Node 225 includes data 232, next pointer 234 and counter number 236.

Referring now to FIFO list 238 illustrated in FIG. 2. As depicted FIFO list 238 includes a tail 240 having a tail node pointer 242 and count number 244. FIFO list 238 also includes a head 246 having a head node pointer 248 and a count number 250. As discussed herein above, exemplary embodiments of FIFO list priority queues can include multiple nodes and as illustrated, FIFO list 238 includes nodes 252 and 260. Node 252 includes data 254, next pointer 256 and count number 258. Node 260 includes data 262, next pointer 264 and count number 266.

Still referring to FIG. 2, the pointer and counter number of a given node together form a node address for a next node in the list of nodes with the pointer pointing to the next node and the count number indicative of the reuse of the next node.

The head node pointer 214 of free list 210 and the head node pointer 248 of FIFO list 238 represent the top of the respective lists and point to the first node on the respective lists (again noting that free list 210 is a LIFO and FIFO list 238 is a FIFO). The tail node pointer 220 of free list 210 and the tail node pointer 242 of FIFO list 238 represent bottoms of the respective lists and point to the last node on the respective lists.

Referring now to free list 210 illustrated in FIG. 2, node 224 is at the top of the stack and is referred to as the free list head, while node 225 is at the bottom of the stack and is referred to as the free list tail. The next pointer 228 of node 224 points to the next node in the free list, in this example node 225, while next pointer 234 of node 225 points to null since node 225 is the tail of the free list 210. In this exemplary embodiment, because free list 210 is a LIFO list, node 225 is the dummy node. As can be appreciated, although free list 210 is illustrated as including two nodes, it is understood that the free list 210 can include any number of nodes and needs only to contain at least one node, i.e. a dummy node.

The head node pointer 212 of free list 210 contains the node address for the free list head, node 224, and includes a head node pointer 214, which points to the free list head node, node 224, and also includes an associated count number 216. Similarly, the free list tail pointer 218 contains the node address for the free list tail, node 225, and includes a tail node pointer 173, which points to the free list tail, node 225, and also includes an associated count number 176.

Referring now to FIFO list 238 illustrated in FIG. 2, node 260 is at the beginning of FIFO list 238 and is referred to as the FIFO list head, while node 252 is at the end of FIFO list 238 and is referred to as the FIFO list tail. The next pointer 264 of node 260 points to the next node in FIFO list 238, node 252, while next pointer 256 of node 252 points to null since node 252 is the tail of FIFO list 238. In this exemplary embodiment, because list 238 is a FIFO list, the FIFO list head, node 260 is the dummy node and contains no data in its data storage location 262. As can be appreciated, although FIFO list 238 is illustrated having including two nodes, it is understood that the FIFO list 238 can include any number of nodes and needs only to contain at least one node, i.e. a dummy node.

The FIFO list head pointer 246 includes the node address for the FIFO list head, node 260, and includes a head node pointer 248, which points to the FIFO list head, node 260, and also includes an associated count number 250. Similarly, the FIFO list tail pointer 240 includes the node address for the FIFO list tail, node 252, and is comprised of a tail node pointer 242, which points to the FIFO list tail, node 252, and an associated count number 244.

A node address for a given node contains a pointer and a count number, and as described herein above, the node address for the node does not reside in the pointer and count number forming the memory packet which constitutes that particular node. Instead, the node address for a particular node is found in the pointer and count number of other nodes which point to the particular node.

Figure 3:
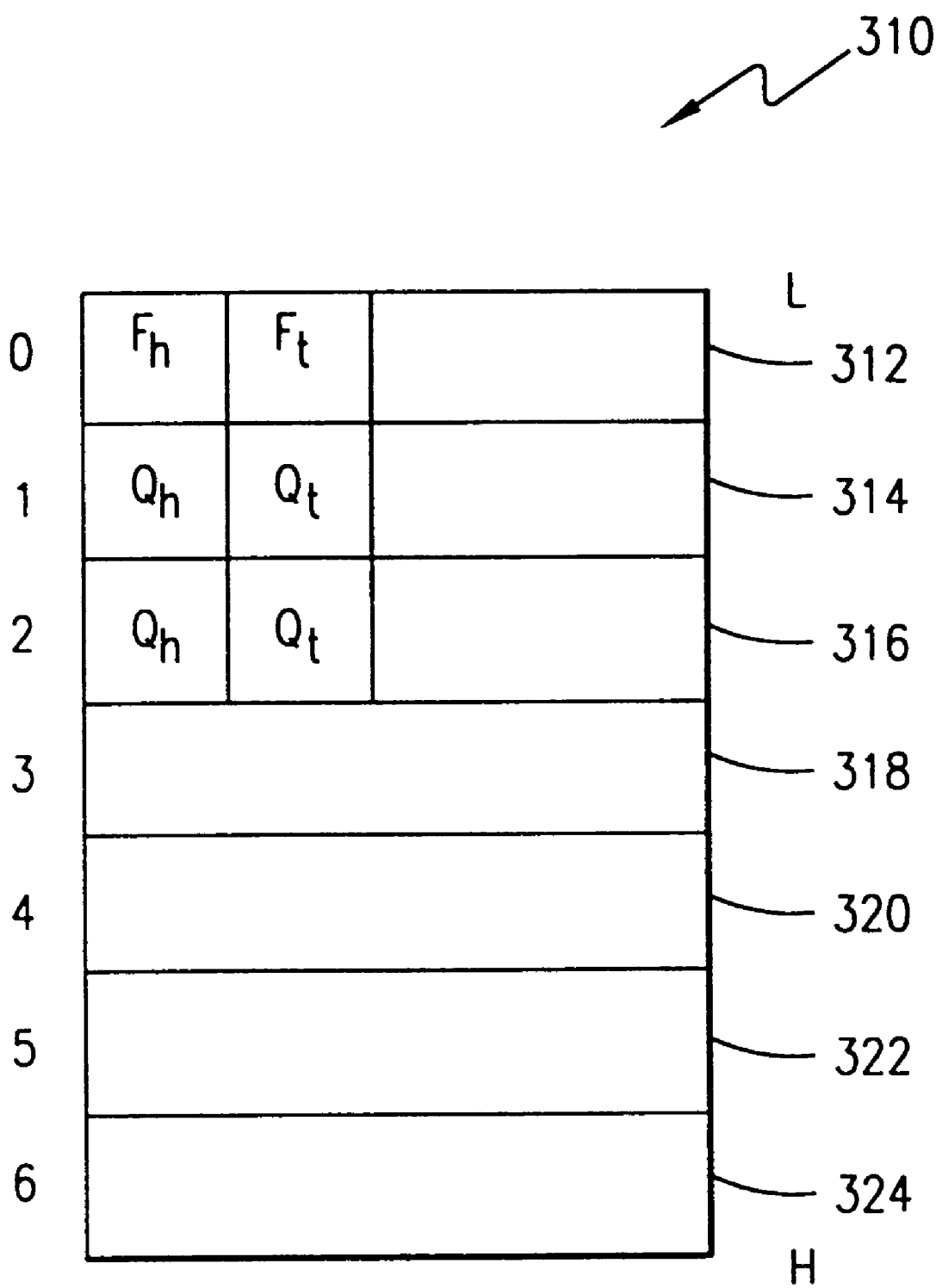
FIG. 3 is a schematic block diagram illustrating in more detail exemplary partition of memory in accordance with the principles of the present invention.

Referring now to FIG. 3, there is illustrated a schematic block diagram illustrating a detail exemplary partition of descriptor memory 310 in accordance with the principles of the present invention. In this embodiment, descriptor memory includes a free list 312, and active FIFO lists, 314 and 316. Descriptor memory 310 is a contiguous portion of memory that is divided or partitioned into lines of memory, 312–324, each being the same size. In this embodiment, a two list priority queue is used such that the first three lines of descriptor memory 310 are reserved. Referring to line 312, $F_h$ and $F_t$ refer to the free list head and free list tail. Similarly, $Q_h$ and $Q_t$ in lists 314 and 316 refer to the heads and tails of the corresponding list of the two priority list. Therefore, the null of the free list will point to zero, the null of the first FIFO priority list will point to one, and the null of the second FIFO priority list will point to two.

Still referring to FIG. 3, as depicted descriptor memory 310 is organized from low part of memory to the high part of memory (numbers zero through six). This is done in this embodiment because a 64 bit compare-and-swap is utilized with a 32 bit engine. This enables 32 bit applications and 64 bit applications to co-exist in the same computer system, even with 32 bit hardware.

An address to the descriptor is just a line number, and in this embodiment any list of which a node will become the tail, the null value will be the line number of descriptor value 310 where the "head/tail" value resides. For example, any node that goes to the tail of the free list will have a null value of zero, referring to list 312.

Referring now to FIGS. 4a–7c, there is illustrated schematic block diagrams depicting exemplary enqueuing and dequeuing of nodes from the free list to the priority list and from the priority list to the free list. It is noted that like elements are depicted through these drawings with the same reference number.

Referring now to FIGS. 4a–4d, there is illustrated schematic block diagrams depicting the dequeuing of a node from a free list queue and the enqueuing of the node to a select FIFO list of a two list priority list queue.

As depicted free list 410 includes a head 414, a tail 416, and nodes 3 and 4. Head 414 points to node 3, and indicated by the head node pointer, and has a count number of 0. Node 3 points to node 4 as indicated by the next pointer, and has a count number of 0. Node 4 points to null (the null for the free list being 0 as described herein above with reference to FIG. 3), and has a count number of 0. Again it is noted that free list 410 is a LIFO list.

Figure 4A:
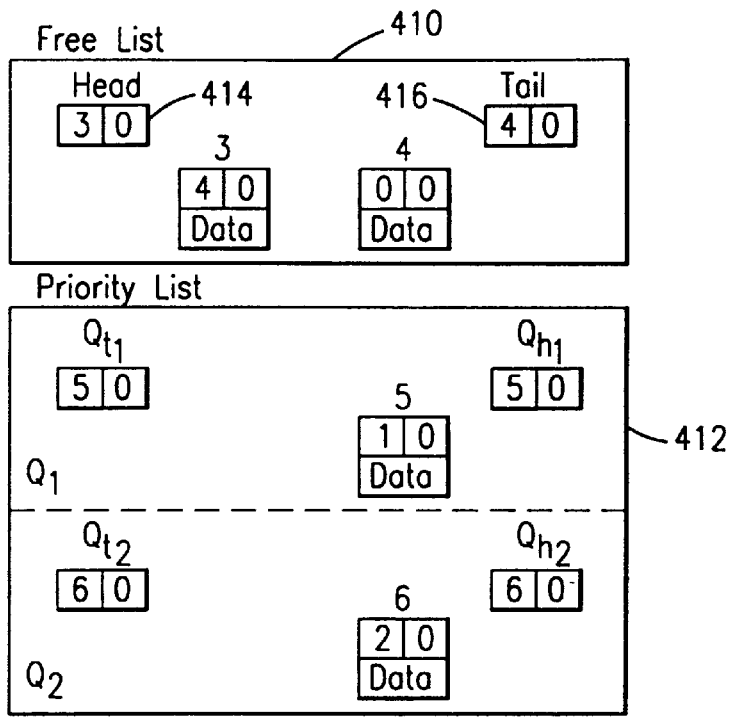
FIGS. 4a–4d are schematic block diagrams illustrating the dequeuing of node 3 from the Free List and the enqueuing of node 3 to FIFO list one.

Still referring to FIG. 4a, the priority list 412 includes two FIFO lists $Q_1$ and $Q_2$. Lists $Q_1$ and $Q_2$ each includes beads and tails, $Q_{h1}$ and $Q_{h2}$ (heads), and $Q_{t1}$ and $Q_{t2}$ (tails), respectively. List $Q_1$ includes a node 5, and as depicted, head $Q_{h1}$ points to node 5, and has a count number of zero. Tail $Q_{t1}$ also points to node 5, and has a count number of zero. As node 5 is the only node on list $Q_1$, node 5 points to null (the null for list 1 being 1 as described herein above with reference to FIG. 3.). Similarly, list $Q_2$ includes a node 6, and as depicted, head $Q_{h2}$ points to node 6, and has a count number of zero. Tail $Q_{t2}$ also points to node 6, and also has a count number of zero. As node 6 is the only node on list $Q_2$, node 6 points to null (the null for list 2 being 2 as described herein above with reference to FIG. 3).

Figure 4B:
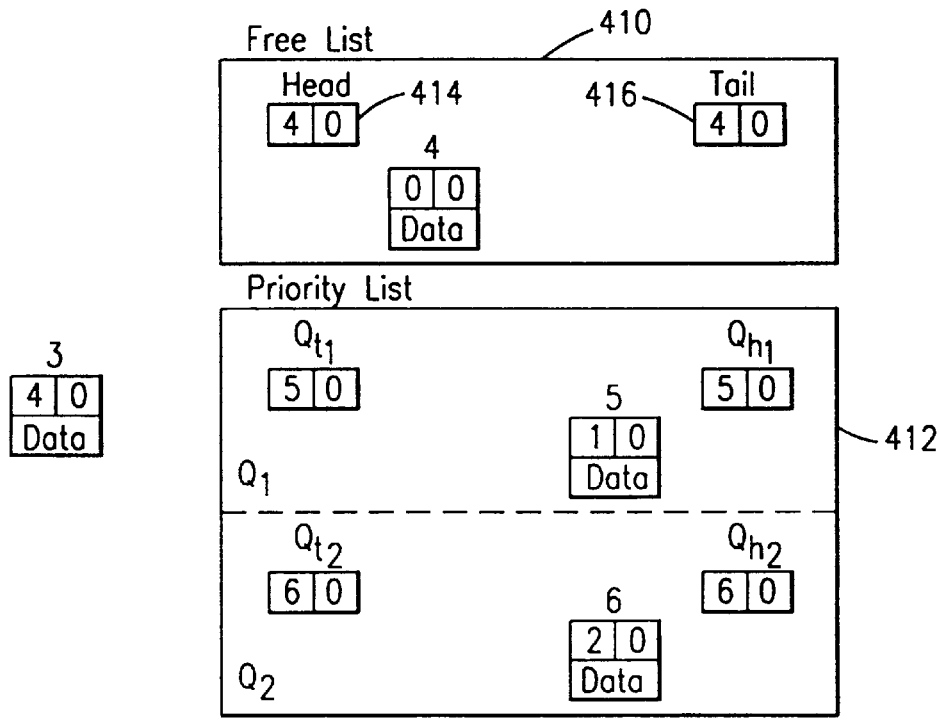
Figure 4C:
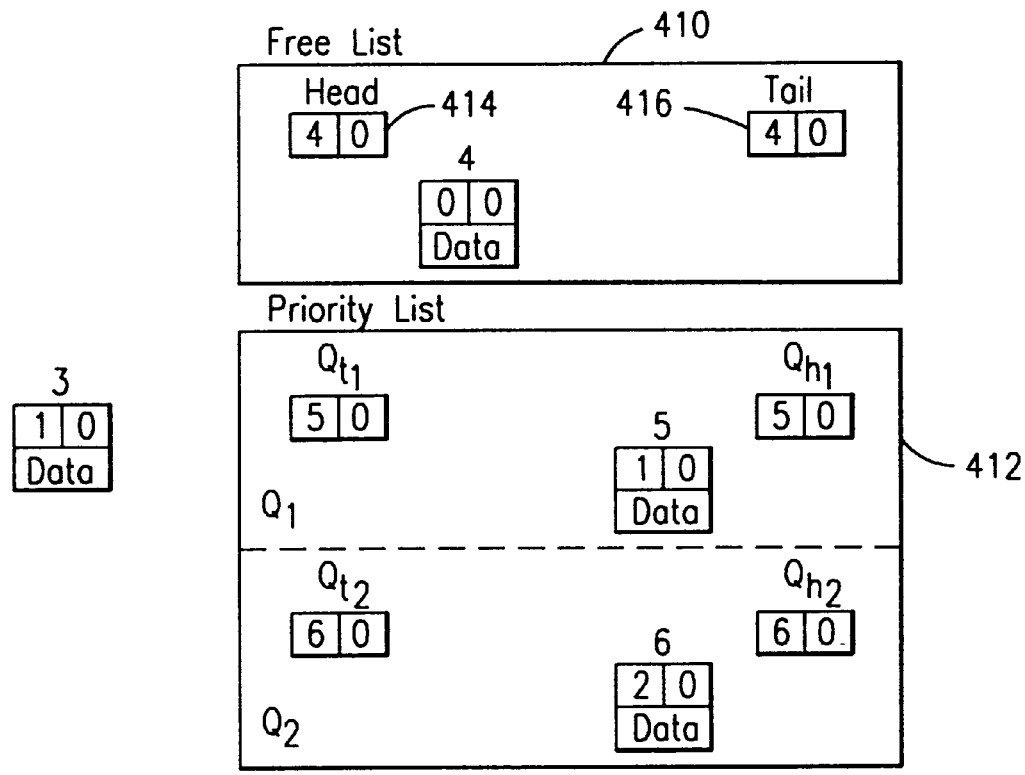

Referring now to FIGS. 4b–4c, there is illustrated the dequeuing of node 3 from the free list and the enqueuing of node 3 to list $Q_1$ of the priority list. As depicted in FIG. 4b, node 3 has been dequeued from free list 410 and the head node pointer of head 414 has been modified to point to node 4. The node address for node 4 can be obtained from the previous node address contained in node 3. It is noted that the next pointer of node 4 of free list 410 still points to null.

Figure 4D:
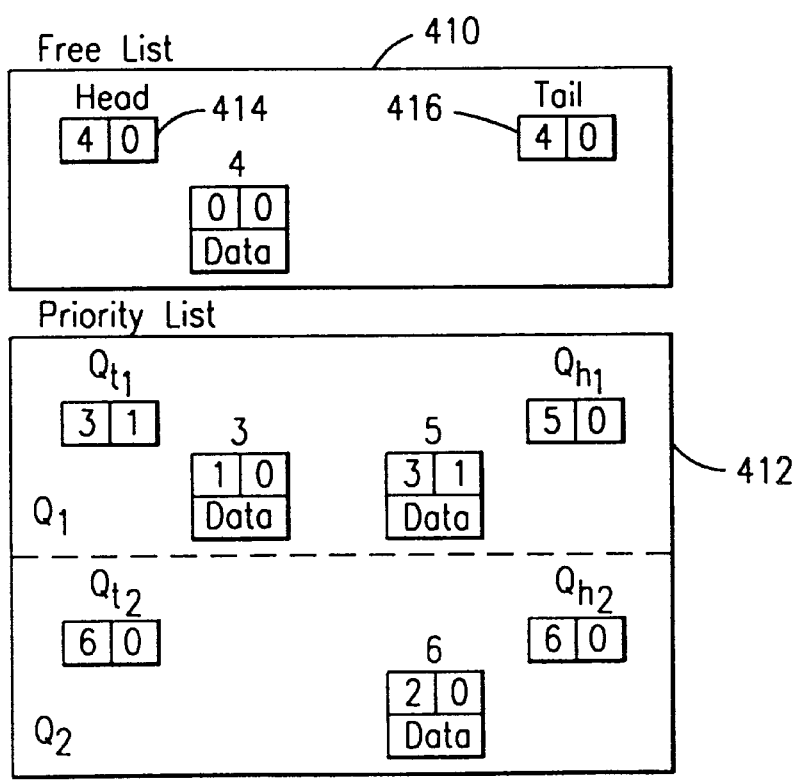

Then, as depicted in FIG. 4c, because $Q_1$ is a FIFO list, node 3 will be at the tail, and therefore the next pointer of node 3 is modified to point to null. Then, as depicted in FIG. 4d, the tail node pointer of $Q_{t1}$ is updated to point to node 3, and the count number of $Q_{t1}$ is incremented. The next pointer of node 5 is updated to also point to node 3, and the count number of node 5 is also incremented.

Figure 5A:
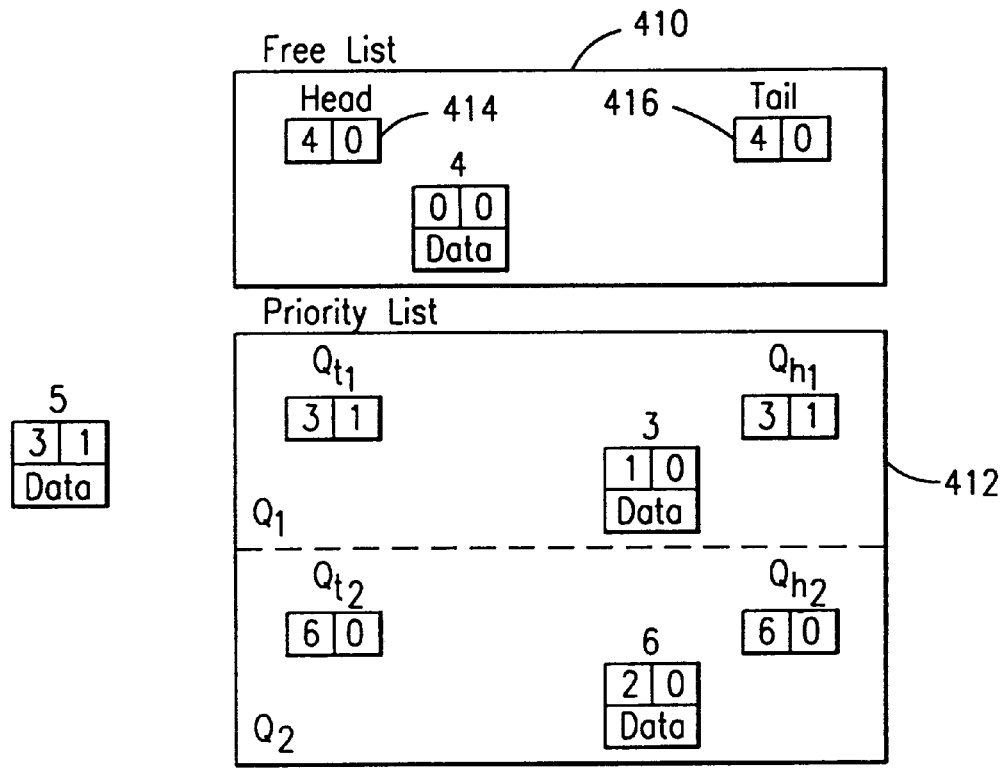
FIGS. 5a–5c are schematic block diagrams illustrating the dequeuing of node 5 from FIFO list one and the enqueuing of node 5 to the Free List.
Figure 5B:
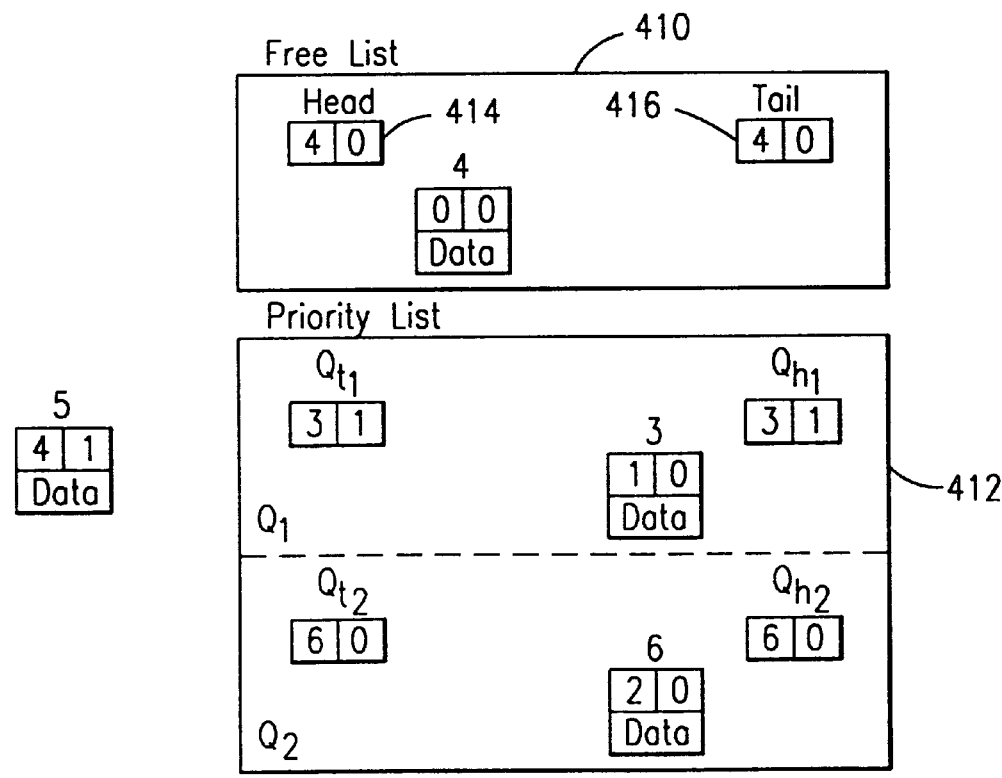
Figure 5C:
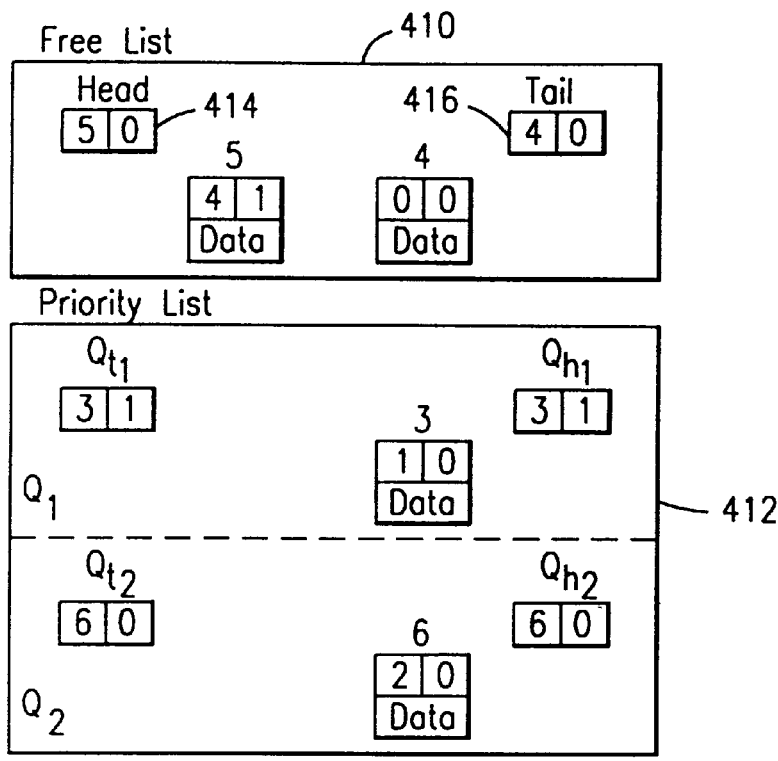

Referring now to FIGS. 5a–5c, there is illustrated the dequeuing of node 5 from $Q_1$ of priority list 412 and the enqueuing of node 5 onto free list 410. Again it is noted that list $Q_1$ is a FIFO list, therefore node 5 is removed from the head. The head node pointer contained in $Q_{h1}$ is modified to point to node 3. (see FIG. 5a).

When a node is removed from one of the FIFO lists of priority list 412 and placed onto the free lists 410, the count number of the node being placed onto the free lists is not incremented. As depicted in FIG. 5b, because node 5 is no longer the $Q_1$ FIFO list head and node 4 is no longer on the free list head, several node address changes occur. The next pointer of node 5 is modified to point to node 4 (note however, the counter remains unchanged). The head node pointer contained in the free list head 414 is modified to point to node 5. The next pointer for node 5 is obtained from the previous head node pointer of $Q_{h1}$. The previous head node pointer of $Q_{h1}$ can be temporarily stored in any manner, for example temporarily storing the value in one of the processors.

Figure 6A:
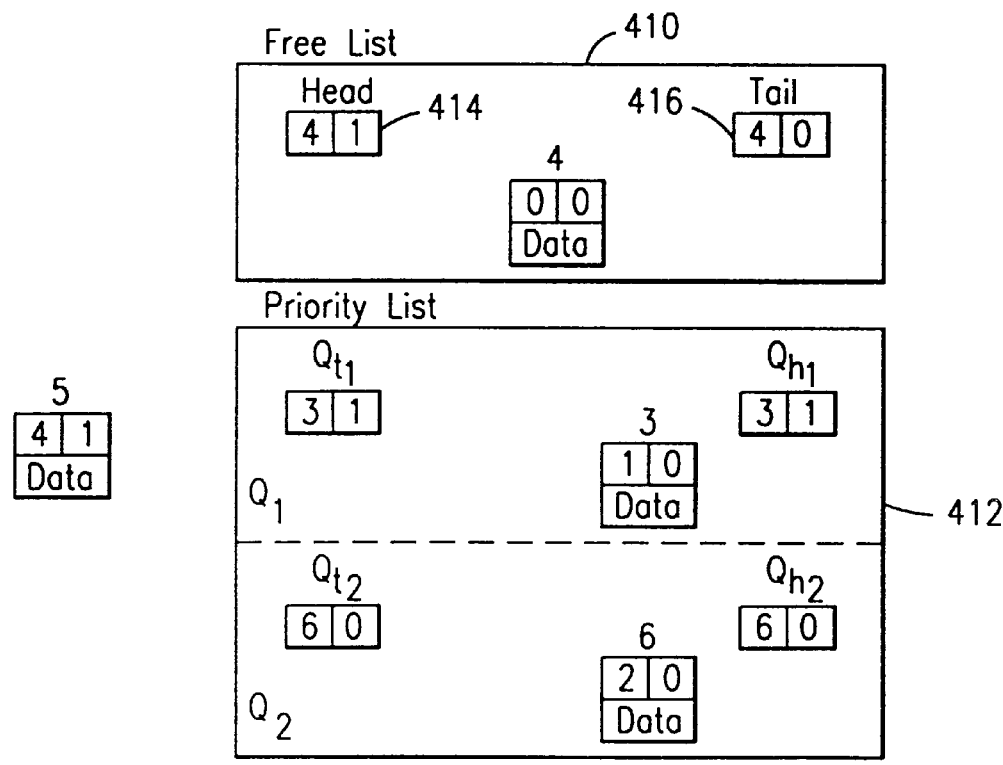
FIGS. 6a–6c are schematic block diagrams illustrating the dequeuing of node 5 from the Free List and the enqueuing of node 5 to FIFO list two.
Figure 6B:
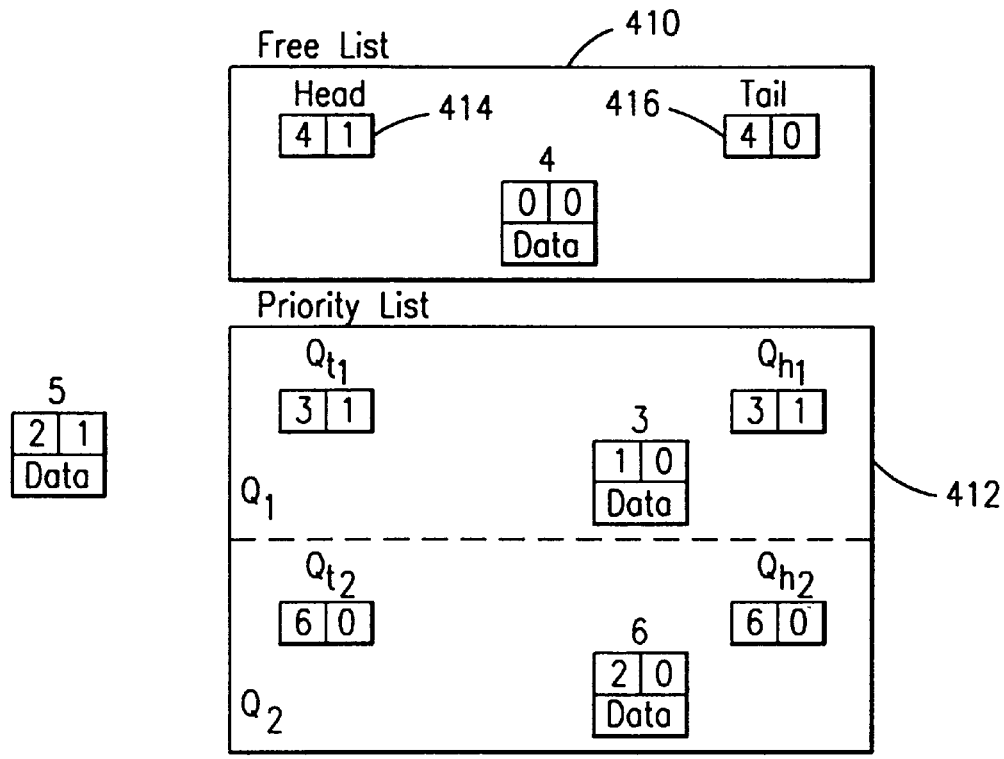
Figure 6C:
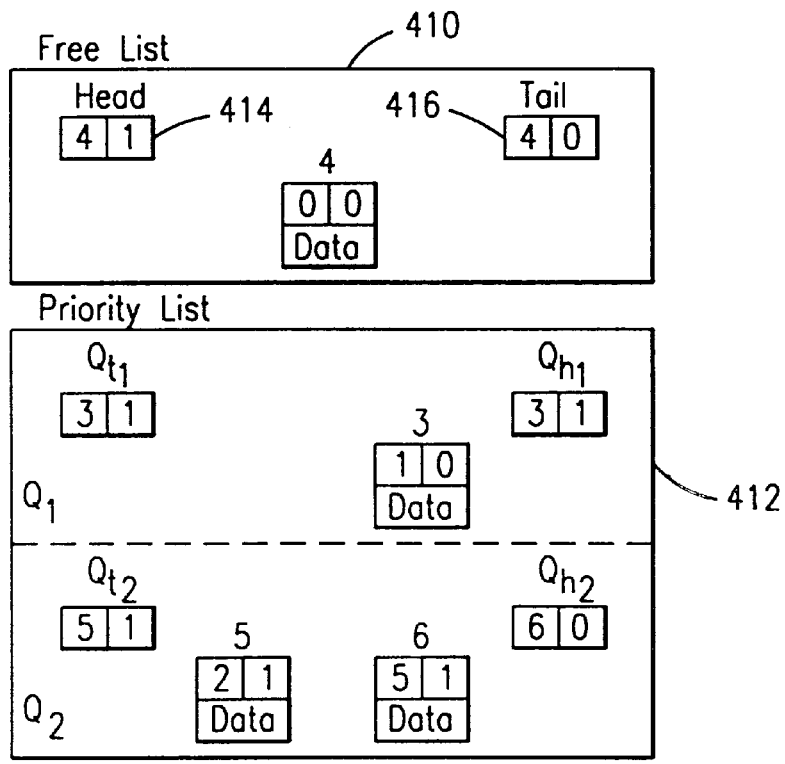

Referring now to FIGS. 6a–6c, there is illustrated the dequeuing of node 5 from free list 410 and the enqueuing of node 5 to list $Q_2$ of the priority list. As depicted in FIG. 6a, node 5 has been dequeued from free list 410 and the head node pointer of head 414 of free list 410 has been updated to point to node 4 (this is obtained from the node address in node 5). It is noted that the next pointer of node 4 of free list 410 still points to null.

Then, as depicted in FIG. 6b, because $Q_2$ is a FIFO list, node 5 will be at the tail, and therefore the next pointer of node 5 is updated to point to null (null being 2), while the count number of node 5 remains unchanged. Then, as depicted in FIG. 6c, the tail node pointer of $Q_{t2}$ is updated to point to node 5, and the count number of $Q_{t2}$ is reflected from the next field of node 6 which incurred the increment of the count number. The next pointer of node 6 is updated to also point to node 5, and its count number is also incremented.

Figure 7A:
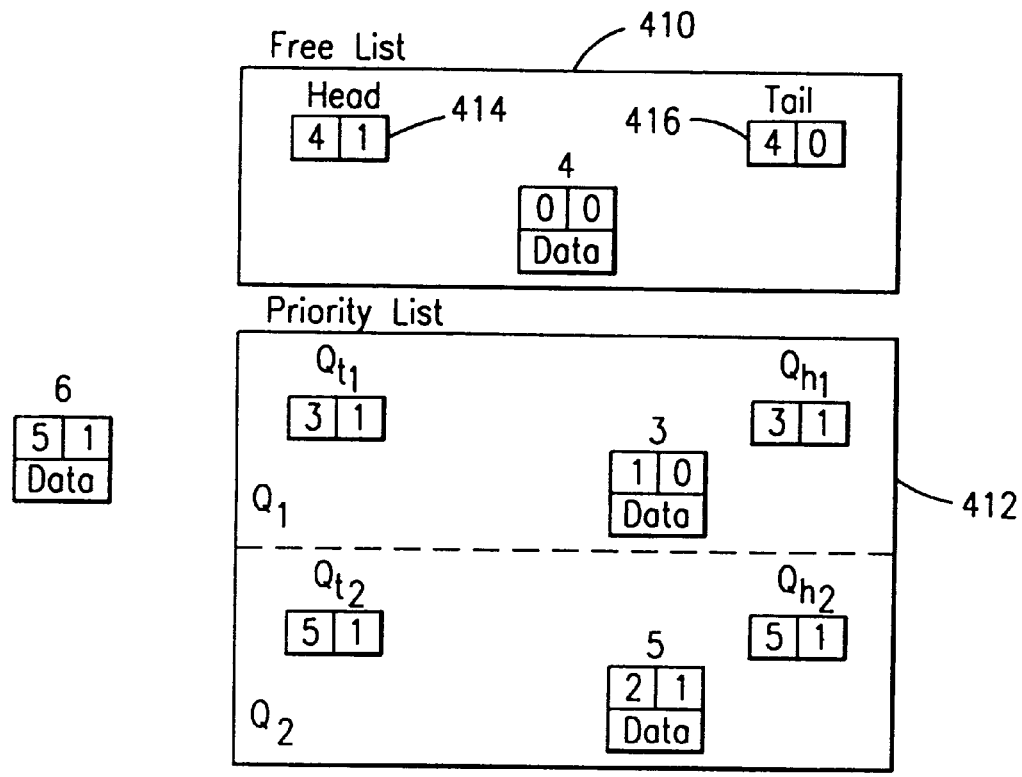
FIGS. 7a–7c are schematic block diagrams illustrating the dequeuing of node 6 from FIFO list two and the enqueuing of node 6 to the Free List.
Figure 7B:
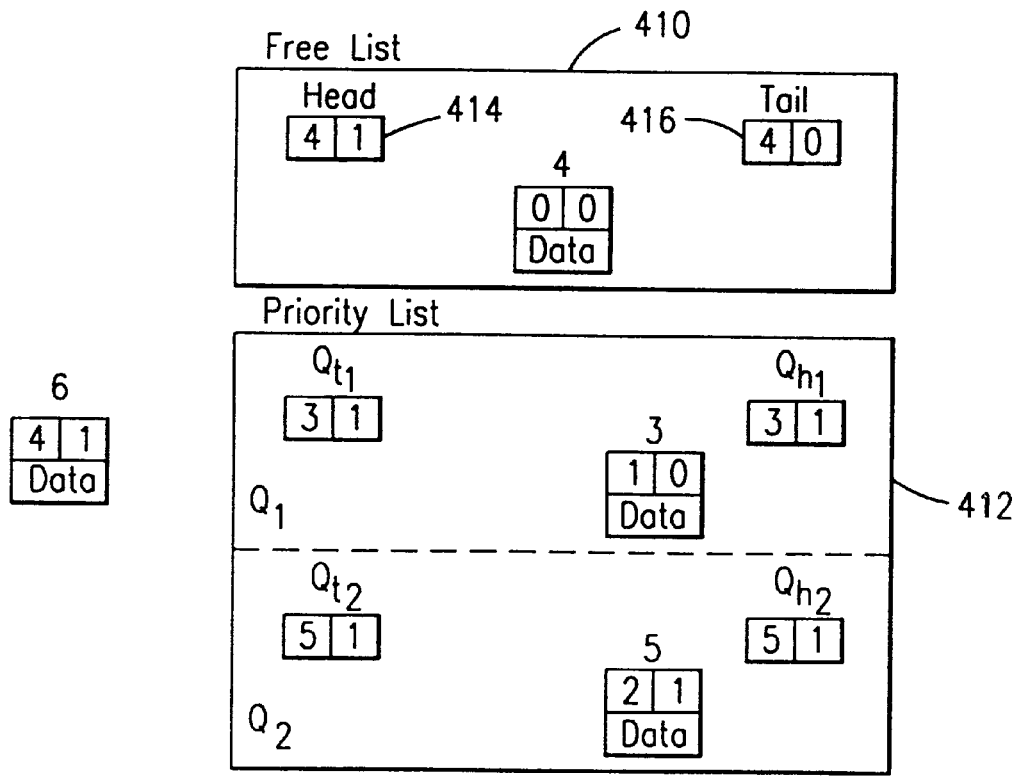
Figure 7C:
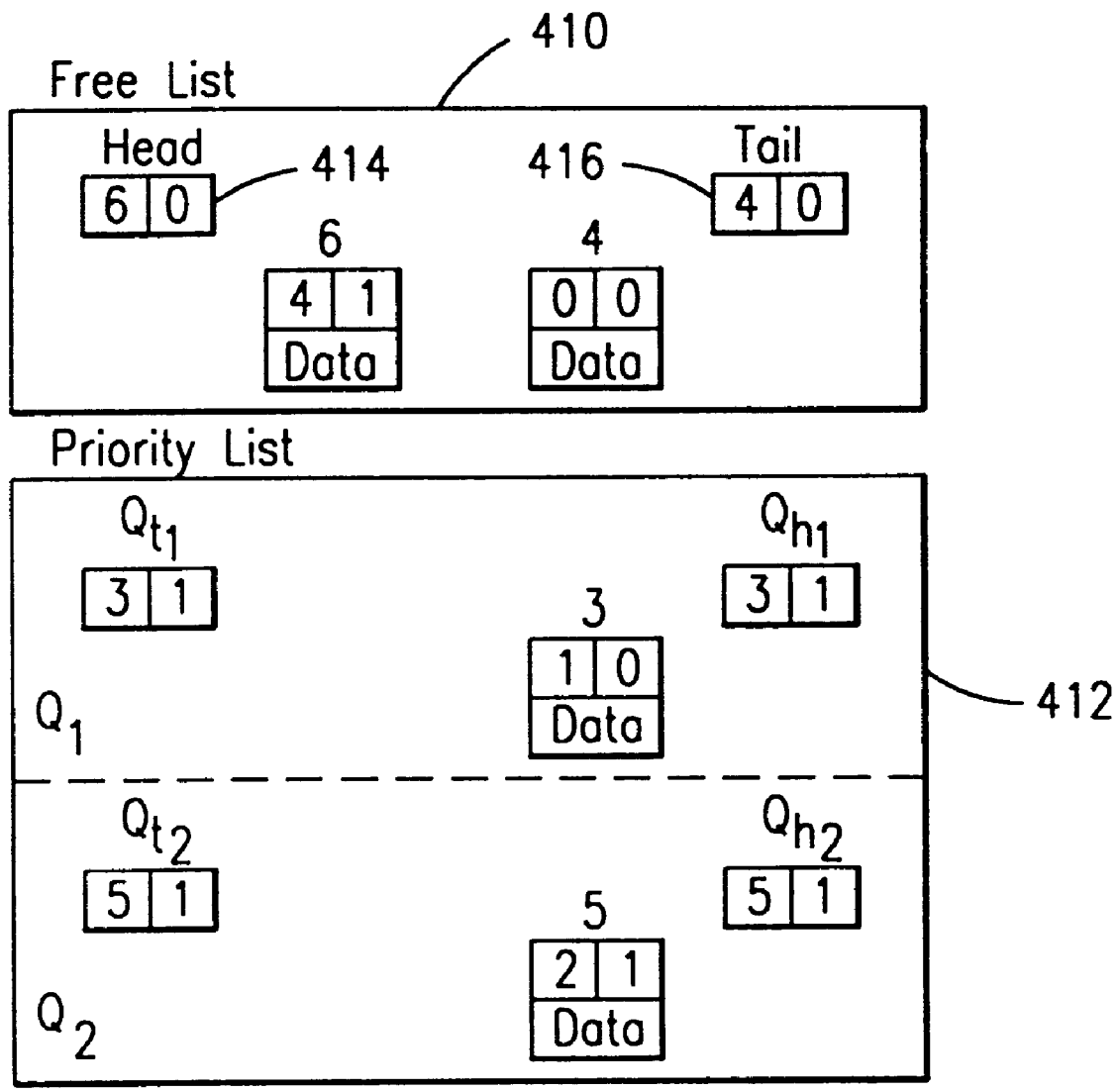

Referring now to FIGS. 7a–7c, there is illustrated the dequeuing of node 6 from $Q_2$ of priority list 412 and the enqueuing of node 6 onto free list 410. Again it is noted that list $Q_2$ is a FIFO list, therefore node 6 is removed from the head of the list. The head node pointer of $Q_{h2}$ is updated to point to node 5, and the counter number of $Q_{h1}$ is reflected from the next field of node 6.

Then, as depicted in FIG. 7b, because free list 410 is a LIFO list, the next pointer of node 6 is updated to point to node 4, while the counter of node 6 remains unchanged. As depicted in FIG. 7c, node 6 is enqueued onto free list 410, and the head node pointer of head 414 is updated to point to node 6, and the counter is changed back to zero. The pointer of node 4 continues to point null.

Figure 8:
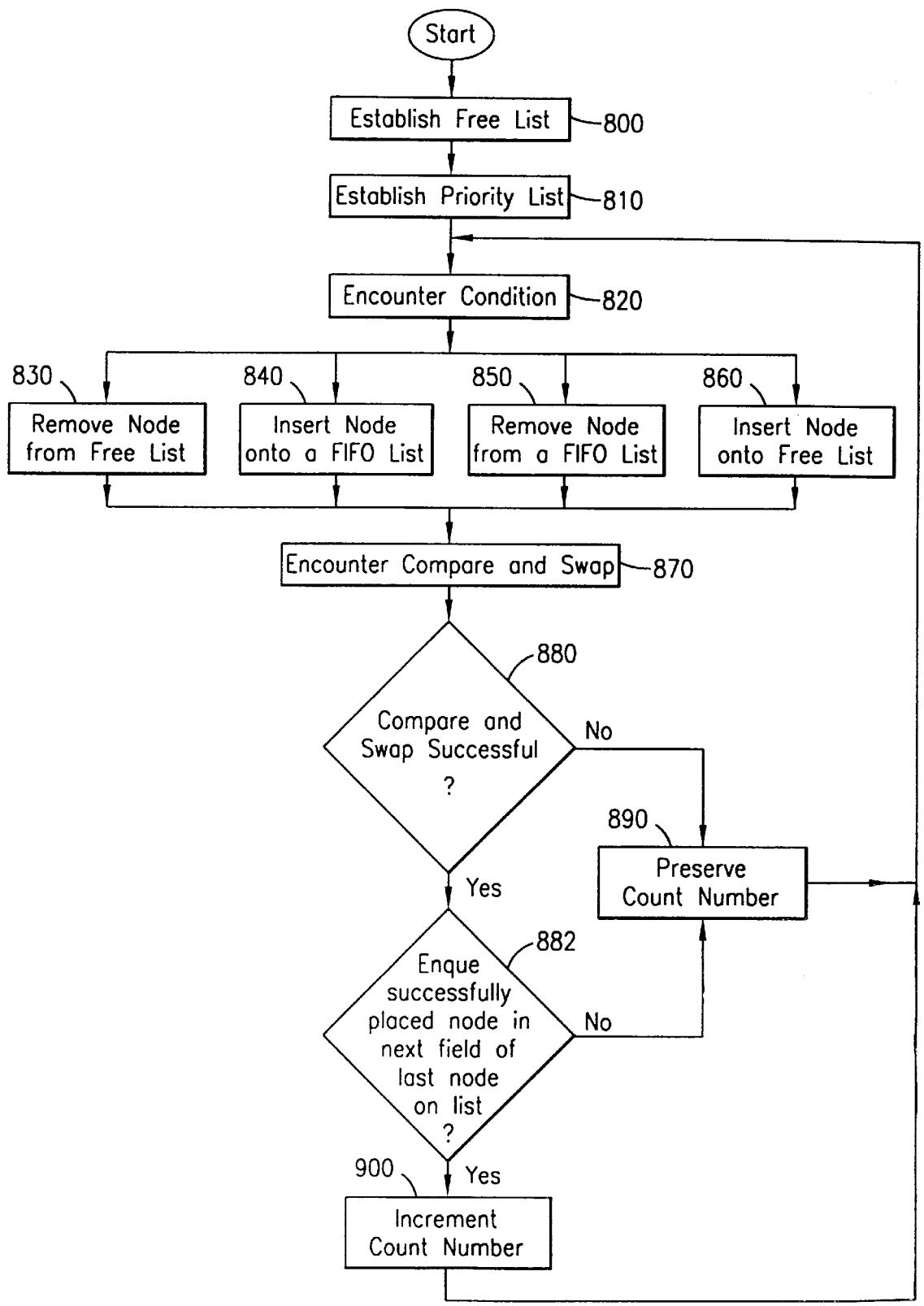
FIG. 8 is a flow diagram of a method for incrementing count numbers associated with addresses of nodes used in concurrent non-blocking priority queues in accordance with the principles of the present invention.

Referring now to FIG. 8, there is illustrated a flow diagram of a method for incrementing count numbers associated with nodes in a concurrent non-blocking priority queue in accordance with the principles of the present invention. The computer system would establish a free list (step 800) and a priority list, including multiple FIFO lists (step 810). During the operating of the processors, a condition is encountered that requires a node, from any of multiple nodes, to be inserted onto or removed for either the free list or one of the FIFO lists of the priority list (step 820). In accordance with the encountered condition, the node is either removed from the free list (step 830), inserted onto one of the FIFO lists of the priority list (step 840), removed from one of the FIFO lists of the priority list (step 850), or inserted onto the free list (step 860). Then, as indicated by step 870, a compare and swap operation occurs (step 870). Subsequent thereto, a determination is made as to whether the compare and swap was successful (step 880). If the determination is made that the compare and swap was successful, the 'yes' path is followed and the determination is made as to whether the enque successfully placed in the next field of the last node on the list (step 882). If this determination is made in the positive, the "yes" path is followed and the corresponding count number is incremented (step 900). If either of the determinations of steps 880 and 882 are negative, the respective 'no' path is followed, and the corresponding count number is preserved (step 890).

Those skilled in the art can realize that the teachings of the present invention as described hereinabove provide computer system wherein the count number for any given node in a free list/priority queue memory is incremented only when successfully removed from the free list and placed onto one of the FIFO lists of the priority queue. This is in contrast to the incrementing of the count number on every successful compare and swap operation as has previously been done. Reducing the number of times the count number is incremented further reduces the number of times the count number wraps around and, therefore, greatly reduces the probability that the "ABA" condition is encountered.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system comprising;

a memory partitioned into at least two lists;

a plurality of nodes residing within said memory, each of said plurality of nodes having a pointer associated therewith, and each of said plurality of nodes having a count number associated therewith; and a plurality of processors, each of said plurality of processors having access to said memory, each of said plurality of processors operable to place a select one of said plurality of nodes onto a select list of said at least two lists, and further for incrementing said count number associated with said select node subsequent to the placing of said select node onto said select list of said at least two lists.

2. The computer system as recited in claim 1, wherein one of said at least two lists is a last-in-first-out list.

3. The computer system as recited in claim 1, wherein a second of said at least two lists makes up a priority list.

4. The computer system as recited in claim 3, wherein said second of said at least two lists is a first-in-first-out list.

5. The computer system as recited in claim 3, wherein said plurality of processors further for incrementing said count number associated with said select node subsequent to the placing of said select node onto said select list of said at least two lists and only if said select list is in said priority list.

6. A computer system comprising;

a memory partitioned into at least two lists;

a plurality of nodes residing within said memory, each of said plurality of nodes having a pointer associated therewith, and each of said plurality of nodes having a count number associated therewith; and a plurality of processors, each of said plurality of processors having access to said memory , each of said plurality of processors operable to remove a select one of said plurality of nodes from a first of said at least two lists, and firer operable to place said select one of said plurality of nodes onto a second of said at least two lists, and further for incrementing said count number associated with said select node subsequent to the placing of said select node onto said second of said at least two lists.

7. The computer system as recited in claim 6, wherein said first of said at least two lists is a free list.

8. The computer system as recited in claim 7, wherein said second of said at least two lists makes up a priority list.

9. The computer system as recited in claim 8, wherein said second list is a first-in-first-out list.

10. The computer system as recited in claim 7, wherein said free list is a last-in-first-out list.

11. A method for performing concurrent non-blocking queuing for a priority list in a computer system utilizing multiple processors, said method comprising the steps of:

enqueuing a select node onto a first-in-first-out list of a priority list; and incrementing a count number associated with the select node subsequent to said step of enqueuing the select node.

12. The method as recited in claim 11, and further comprising the step of dequeuing the select node from a free list prior to said step of enqueuing the select node.

13. The method as recited in claim 12, and further comprising the step of updating pointers associated with the dequeued node subsequent to said step of dequeuing the select node.

* * * * *

UNITED STATES PATENT AND TRADEMARK OFFICE
CERTIFICATE OF CORRECTION

PATENT NO. : 6,173,373 B1
DATED : January 9, 2001
INVENTOR(S) : Thomas J. Bonola Page 1 of 1

It is certified that error appears in the above-identified patent and that said Letters Patent is hereby corrected as shown below:

Claim 6,
Line 11, delete the word "firer" and substitute --further--, therefor.

Signed and Sealed this

Fourteenth Day of August, 2001

*Attest:*

*Attesting Officer*

NICHOLAS P. GODICI
*Acting Director of the United States Patent and Trademark Office*